(12) United States Patent
Fattah

(10) Patent No.: US 8,359,172 B2
(45) Date of Patent: Jan. 22, 2013

(54) UNDERWATER DEPTH MEASUREMENT DEVICE

(75) Inventor: Eric Abdel Fattah, Vancouver (CA)

(73) Assignee: Eric Abdel Fattah, Vancouver, British Columbia (CA)

( * ) Notice: Subject to any disclaimer, the term of this patent is extended or adjusted under 35 U.S.C. 154(b) by 330 days.

(21) Appl. No.: 12/909,798

(22) Filed: Oct. 21, 2010

(65) Prior Publication Data

US 2011/0098947 A1    Apr. 28, 2011

Related U.S. Application Data

(60) Provisional application No. 61/254,002, filed on Oct. 22, 2009.

(51) Int. Cl.
*G06F 17/00* (2006.01)
(52) U.S. Cl. .......................................................... 702/53
(58) Field of Classification Search .................... 702/53, 702/47, 182–185
See application file for complete search history.

(56) References Cited

U.S. PATENT DOCUMENTS 4,658,358 A * 4/1987 Leach et al. ................. 73/865.1

* cited by examiner

*Primary Examiner* — Edward Raymond
(74) *Attorney, Agent, or Firm* — Geoffrey deKleine; Borden Ladner Gervais LLP

(57) ABSTRACT

An underwater depth measurement device includes a piezoresistive ceramic transducer in communication with a circuit for outputting an absolute pressure.

11 Claims, 8 Drawing Sheets

UNDERWATER DEPTH MEASUREMENT DEVICE

CROSS-REFERENCE TO RELATED APPLICATIONS

This application claims the benefit of U.S. Provisional Patent Application No. 61/254,002, filed on Oct. 22, 2009, the entire content of which is incorporated herein by reference.

TECHNICAL FIELD

The present application relates to underwater depth measurement and to an underwater depth measurement device.

BACKGROUND DISCUSSION

When diving underwater, a diver needs a device which measures his depth underwater. A device which provides the diver an indication of depth can be of several types. A mechanical gauge has no electronic components, but is extremely inaccurate. In recent decades, electronic depth measurement devices have been used for improved accuracy. In addition to providing the diver with an indication of his depth underwater, information about the diver's depth can be used to calculate the necessary ascent schedule to avoid decompression sickness. As such, a device which can measure depth underwater has a multitude of purposes for the diver.

As the pressure underwater increases dramatically and linearly with depth, the traditional approach to measure depth is to measure the ambient pressure in the vicinity of the diver. This pressure can be easily and quickly converted into a depth by a microprocessor and rendered on a display to a diver.

Measuring pressure underwater is accomplished by a pressure transducer. Numerous different kinds of pressure transducers exist, such as piezoresistive silicon transducers, for example.

Piezoresistive silicon transducers consist of a small silicon die etched with pressure sensitive resistors. Extremely thin microwires are bonded to this die, and these microwires are then bonded to a larger package. When the pressure increases, the resistance of the resistors on the silicon die changes, and with proper signal processing, the change of resistance can be converted into a pressure.

The silicon die and the microwires bonded to the silicon directly experience the pressure to be measured, however, these components are not waterproof. Therefore, the die and microwires are protected from water by some medium that allows pressure to be transmitted through the medium. Known methods for waterproofing the components involves covering the die and microwires with an oil and sealing the oil with a stainless steel membrane, or, alternatively, potting the die and microwires with a very soft silicone gel.

When the die and microwires are immersed in oil and sealed with a steel membrane which transmits the pressure, the result is a product which has high accuracy and high stability. Two drawbacks of such a product are extremely high cost, and low mechanical shock survivability. An extreme mechanical shock can cause the microwires to break or debond from the die, causing the transducer to fail irreparably. The cost of the oil filled stainless steel membrane silicon die transducer is typically at least $60 USD even in high quantities, making it impractical for all except the most expensive underwater products.

Another known method of protecting the silicon die and microwires from water is to pot them with an extremely soft silicone gel. This has the advantage of greatly reducing the cost compared with the oil filled solution. A gel filled silicon piezoresistive sensor array may sell for $6-$15 USD in large quantities. Companies which are currently producing pressure transducers specifically for diving are all producing gel filled silicon piezoresistive pressure transducers. Unfortunately, gel filled piezoresistive silicon pressure transducers are extremely unreliable for numerous reasons.

Firstly, the gel used to pot the sensor, although very soft, is far more rigid than oil. The gel expands and contracts as it heats and cools during normal operation as the diver immerses himself in cold water, and then exposes himself to sunlight. As the gel expands and contracts, it pulls the microwires along with it, which can cause them to break. Further, strong mechanical shocks to the sensor create shockwaves which travel through the gel, which can create displacements within the gel, which can again break the microwires bonded to the die. In addition, silicone gels have inherently poor resistance to water and seawater. Silicone has a tendency to absorb moisture, and although numerous methods have been devised to reduce that tendency, the tendency cannot be completely eliminated. Silicone also has trouble bonding or sticking to various types of surfaces, and the curing of two part addition cure silicones can be inhibited by impurities on the surfaces to be bonded. Even when bonding perfectly clean surfaces, complicated 'primer' chemicals are needed to help the bonding process. Despite that, poor bonding can still occur. If the gel is not properly bonded to the die and microwires, then water can seep in between the gel and the die, causing a flood failure.

Given the numerous failure mechanisms of gel filled silicon sensors, and given that these sensors are by far the predominant ones used in the industry, then one would expect the industry to be filled with reports of pressure transducer failures in depth measuring underwater products. That is in fact exactly the case. Consulting any expert in the field or even performing a simple internet search will reveal that the predominant failure mechanism of underwater depth measuring products is failure of the pressure transducer. Given the numerous failure mechanisms of gel filled silicon sensors, and the extreme challenges to manufacture them around those failure mechanisms, one would expect variability from one batch to the next of such sensors. That is in fact the case, where numerous times in the industry, entire production runs of depth measuring instruments have been recalled or replaced due to faulty, defective, or poorly manufactured gel filled silicon sensors.

The failure rate of the standard sensors used in the industry is so high that most manufacturers of depth measuring devices have devised methods of trying to protect, reinforce or otherwise improve the performance of the gel filled silicon sensors. Alternatively, some products are designed such that a failed pressure transducer can be easily replaced by a technician. In that case, the entire product may be designed around ease of replacement of the pressure transducer, due to the high anticipated failure rate of the transducer.

Improvements in underwater depth measurement devices are desirable.

SUMMARY

In an aspect there is provided an underwater depth measurement device, including: a housing; a piezoresistive ceramic transducer received in the housing, the piezoresistive ceramic transducer being operable to measure changes in absolute pressure of less than 0.001 bar; an electronic circuit operably connected to the piezoresistive ceramic transducer to receive signals from the piezoresistive ceramic transducer in response to measured changes in absolute pressure and to amplify the signals; a temperature sensor; a microprocessor operably connected to the electronic circuit and the temperature sensor, the microprocessor for receiving amplified signals and a signal corresponding to a measured temperature; wherein the underwater depth measurement device determines a depth based on the measured changes in absolute pressure and the measured temperature.

Other aspects and features of the will become apparent to those ordinarily skilled in the art upon review of the following description of specific in conjunction with the accompanying figures.

BRIEF DESCRIPTION OF THE DRAWINGS

Embodiments of the present application will now be described, by way of example only, with reference to the attached Figures, wherein.

DETAILED DESCRIPTION

Figure 1:
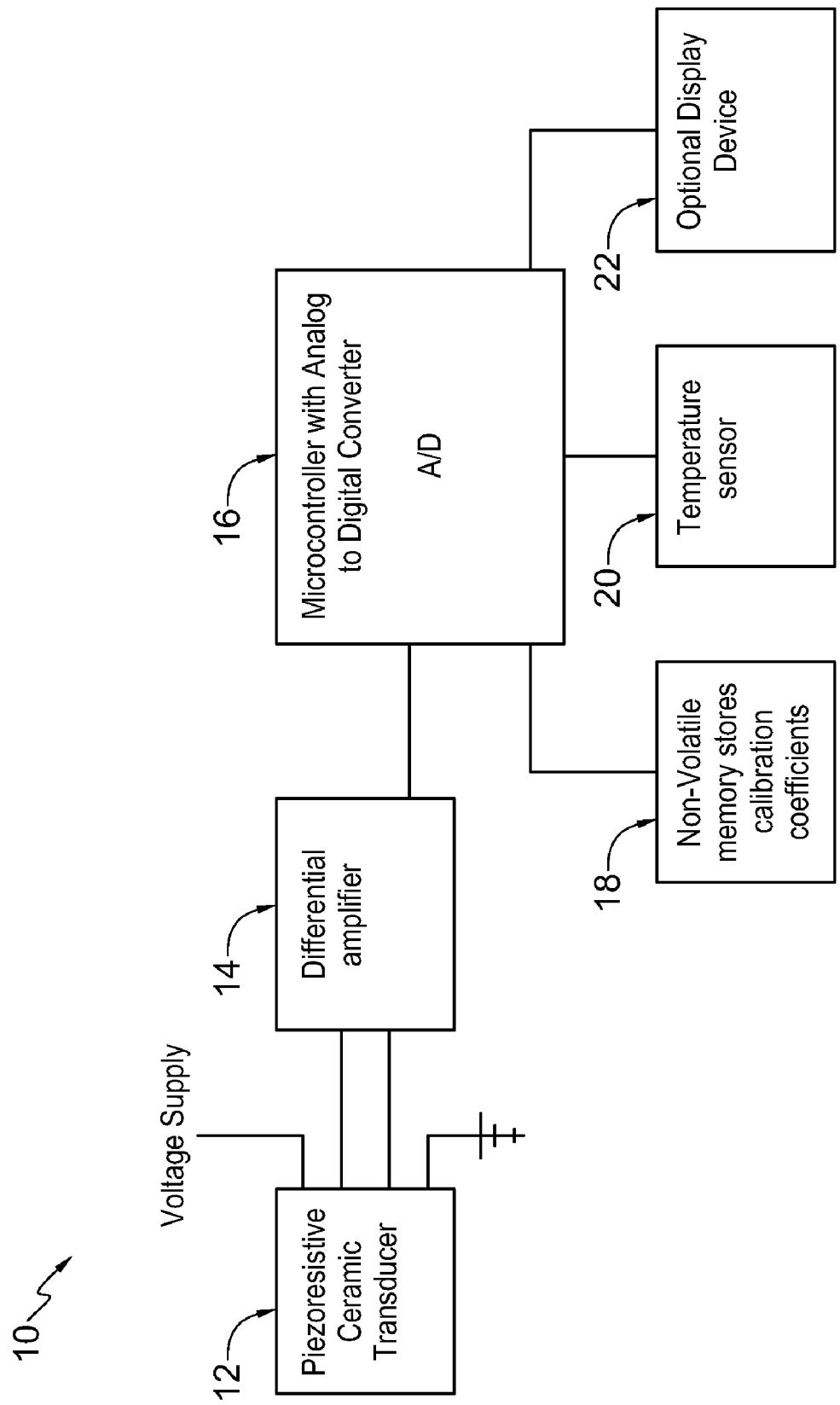
FIG. 1 is a block diagram of an example embodiment of an underwater depth measurement device of the present application.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Generally, described is an underwater depth measurement device which provides a user with an indication of his/her depth underwater when diving. Because calculation of decompression schedules for scuba divers is based on absolute pressure, and not depth, the underwater depth measurement device of the present application is capable of determining absolute pressure.

Referring to FIG. 1, a block diagram of an example embodiment of an underwater depth measurement device 10 of the present application is shown. The underwater depth measurement device 10 includes a piezoresistive ceramic transducer 12 connected to a microcontroller 16 through a differential amplifier 14. The microcontroller 16 is further connected to a non-volatile memory 18 and a temperature sensor 20. Optionally, the underwater depth device 10 may also include a display device 22 connected to the microcontroller 16 to provide information to a diver about their depth, and optionally their suggested ascent schedule to avoid decompression sickness. The underwater depth measurement device 10 further includes a power source for supplying a voltage to the circuit, which includes the piezoresistive ceramic transducer 12, the microcontroller 16, the differential amplifier 14, the non-volatile memory 18 and the temperature sensor 20. The power source may be a battery, a rechargeable battery or a capacitor, for example.

Alternatively, the circuit may be environmentally powered using kinetic, solar or thermoelectric power, for example.

Figure 2:
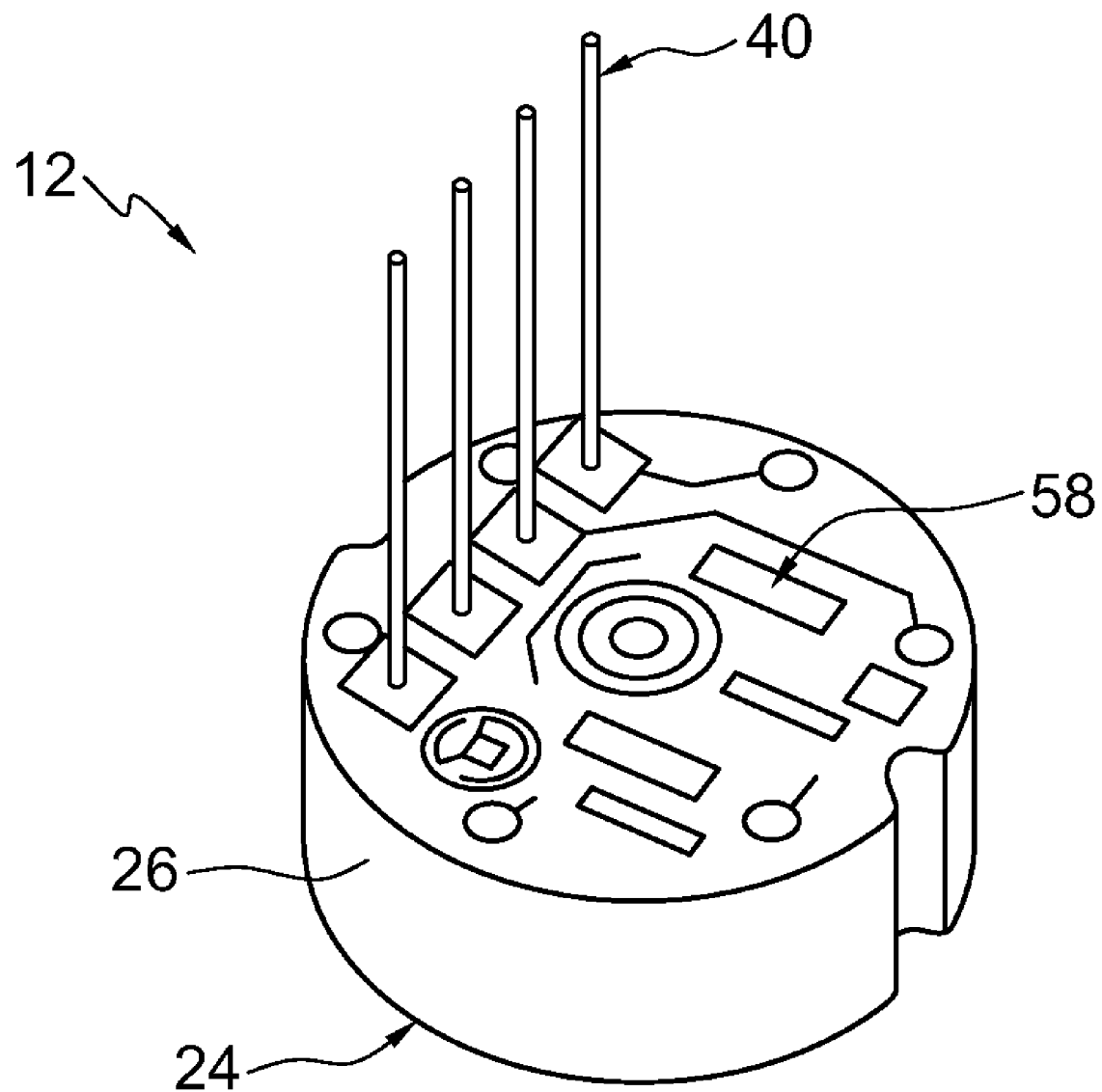
FIG. 2 is an isometric view of the pressure transducer of the present application.

Referring also to FIG. 2, the piezoresistive ceramic transducer 12 may be a thick-film piezoresistive ceramic transducer 12 including electrical connectors 40 for communicating with a printed circuit board (PCB), which includes the electrical components of FIG. 1. The piezoresistive ceramic transducer 12 further includes a transducer PCB 58 and a ceramic diaphragm 24 that is provided on an underside of the piezoresistive ceramic transducer 12, opposite the electrical connectors 40. The ceramic diaphragm 24 includes a series of electrical resistors (not shown) that are printed on the ceramic diaphragm 24 using thick-film technology. An example of a suitable piezoresistive ceramic transducer 12 is Metallux ME506, which includes a 15 mm diameter and is capable of absolute pressure measurement up to 20 bar.

As shown in FIG. 2, the diaphragm 24 is coupled to a ceramic housing 26 which is sealed so that the inside of the piezoresistive ceramic transducer 12 is at vacuum pressure. When the pressure outside the piezoresistive ceramic transducer 12 increases, the ceramic diaphragm 24 flexes towards the center of the pressure transducer 12. This flexing of the diaphragm 24 causes a strain in the series of electrical resistors printed on the underside of the diaphragm 24. As the resistance of these resistors changes, the change of resistance is converted to a pressure by the differential amplifier 14 and the microcontroller 16. When assembled, the ceramic housing 26 is generally isolated from any stresses and strains, which can affect the accuracy and stability of the pressure readings.

The differential amplifier 14 functions to amplify the signal generated by the piezoresistive ceramic transducer 12. The differential amplifier 14 is generally capable of far greater amplification than prior art devices that include silicon piezoresistive sensors because when exposed to similar operating conditions, the change in resistance of the resistors printed on the ceramic diaphragm 24 is orders of magnitude smaller than a change of resistance in prior art silicon piezoresistive sensors.

The thick-film method by which the resistors are printed on the underside of the ceramic diaphragm 24 allows printing of simple, passive electronic components. All electronic signal processing is done by integrated circuits that are located outside the ceramic pressure transducer. As such, the piezoresistive ceramic transducers 12 are typically calibrated by the manufacturer of the underwater depth measurement device 10 rather than by the manufacturer of the pressure transducer. This is different from gel filled silicon sensors that use silicon dies which can include both piezoresistive elements, as well as transistors and non-volatile memories. This allows silicon sensors to be sold pre-calibrated, with calibration coefficients stored in non-volatile memories, and signal amplification and processing circuitry can be contained on the same die as the piezoresistive elements.

In one embodiment, the output signal from the piezoresistive ceramic transducer 12 is amplified by a factor of 378 times, and the amplified signal is digitized at a resolution of 15-bits or more. The signal strength from the piezoresistive ceramic transducer is related to the temperature of the transducer. In this embodiment, the electronic signal conditioning hardware is as follows: a differential amplifier 14 capable of amplifying the signal by a factor of 378 or more, an analog to digital converter with a resolution of 15-bits or more, a temperature sensor 20 which can be read by a microcontroller 16, a microcontroller 16 to read the digital result from the analog to digital converter, and a non-volatile memory 18 to store calibration coefficients. The digital result from the analog to digital converter appears as a number from 0 to 32767 (in the case of 15-bit digitization), which is digitally read by the microcontroller 16. Further, to ensure signal integrity and adequate resolution, all solder flux residues are cleaned from the PCB and ceramic transducer and traces containing sensor signals are preferably spaced by at least 1 mm from other PCB traces both horizontally and vertically through the PCB.

The output signal and A/D converter resolution values of this embodiment are calculated as follows. Some piezoresistive ceramic transducers are capable of reading a pressure of up to 500 bar or more. A typical piezoresistive ceramic transducer has an output signal of 2:4 mV per volt of excitation, when the transducer is exposed to its maximum rated pressure. Typically, the sensor bridge is excited with 3.3V. Thus it is possible to calculate the full scale output range of the transducer. Using for example a sensor with a maximum rated pressure of 20 bar: 2.4 mV/V@20 bar. The maximum output signal at 20 bar is 3.3V*2.4 mV/V=7.92 mV. Therefore, the output signal of the ceramic transducer ranges from 0 mV to 7.92 mV (from 0 bar to 20 bar).

For the present application, the small signal output from the transducer is amplified by differential amplifier 14 prior to being digitized. The analog to digital converter in a 3.3V circuit can typically digitize values from 0V to 3V. Thus, the amplified signal range is approximately 0 to 3V and the amplification factor is 3.00V/0.00792 V=378x.

When measuring depth, the resolution should be 1 cm or better in order to accurately measure the barometric pressure at the surface, which plays a role in calculating the nitrogen degassing rate from the blood after a deep dive. For a sensor reading up to 20 bar of pressure, the resolution calculation is: 20 bar absolute pressure=19 bar of water pressure=approximately 190 m of depth and 190 m=19000 cm.

A resolution of 1 cm or better corresponds to 1 part in 19000 (0.005%) over the output range of the pressure transducer. A 14-bit A/D converter would provide 16384 steps: 19000/16384=1.16 cm resolution. A 15-bit ND converter would provide 32768 steps: 19000/32768=0.58 cm resolution.

From the above information, it is possible to calculate the change in signal strength across the smallest increment of resolution. A resolution of 1 cm is approximately 0.001 bar and 7.92 mV/20 bar=0.396 mV/bar. Therefore, 0.001 bar*396 uV/bar=396 nV. A change of 1 cm of depth results in a change of just 396 nanovolts in the output signal of the pressure transducer 12. This resolution is achieved by using electronic circuitry that is significantly more advanced than the circuitry of traditional sensors that have larger output signals.

Sensor mounting will now be discussed with reference to the embodiments depicted in FIGS. 3 to 8. In general, the housing 28 is waterproofed so that the contents of the housing 28 are isolated from the water when the housing 28 is immersed. When assembled and waterproofed, the piezoresistive ceramic transducer 12 is exposed to the ambient pressure of the water that is outside of the housing 28. If the piezoresistive ceramic transducer 12 is not mounted properly, significant errors may occur in the pressure measurement. In addition, flooding or failure of the device 10 may occur. Different methods may be employed to waterproof the device 10 such as: 'air filled,' 'oil filled' and 'potted' methods, for example.

Manufacturers of piezoresistive ceramic transducers advertise that only the central area of the ceramic diaphragm is sensitive to pressure. However this is not accurate. Stresses applied to anywhere on the transducer can create anomalous errors in the pressure signal. When building underwater devices that are 'potted,' it is common to use rigid or semi-rigid potting materials having a Shore hardness of A50 to D80. However, if a piezoresistive ceramic transducer 12 is potted in such a material, even if the diaphragm 24 itself is open and exposed, the potting material will exert sufficient stresses to the ceramic housing 26 that anomalous errors will occur, and these errors will be non-repeatable in such a fashion that they cannot be compensated for by any analytical algorithm. Therefore, the housing of the ceramic transducer is preferably only covered with gas, oil, or a very soft potting material, such as a potting material having a Shore hardness of A20 or softer.

Figure 3:
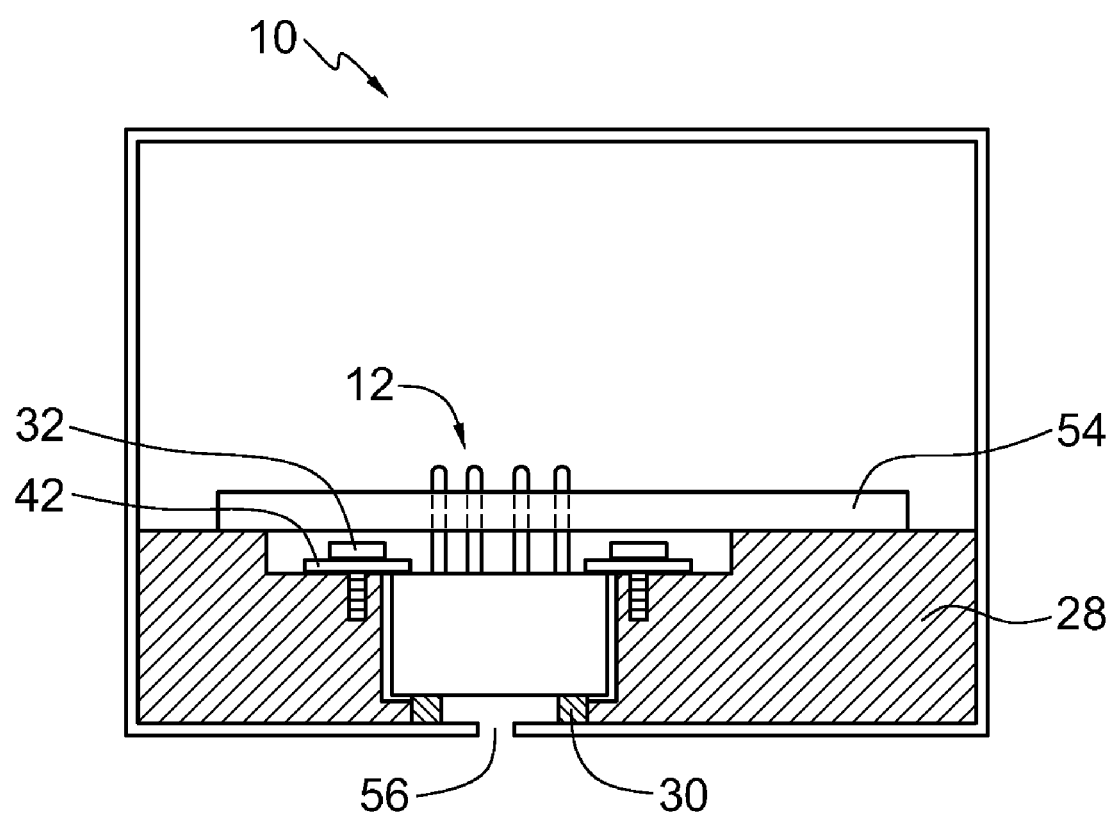
FIG. 3 is a side view of an embodiment of the pressure transducer mounted within the housing of the underwater depth measurement device of the present application.

Referring to FIG. 3, the underwater depth measurement device 10 generally includes a housing 28 for receiving the piezoresistive ceramic transducer 12 and the other electronic components of FIG. 1, which are provided on a printed circuit board 54. The housing 28 is generally rigid and may be manufactured from metal, plastic or a composite material, for example. An aperture 56 is provided in the housing 28 adjacent to the ceramic diaphragm 24 of the piezoresistive ceramic transducer 12.

Figure 4:
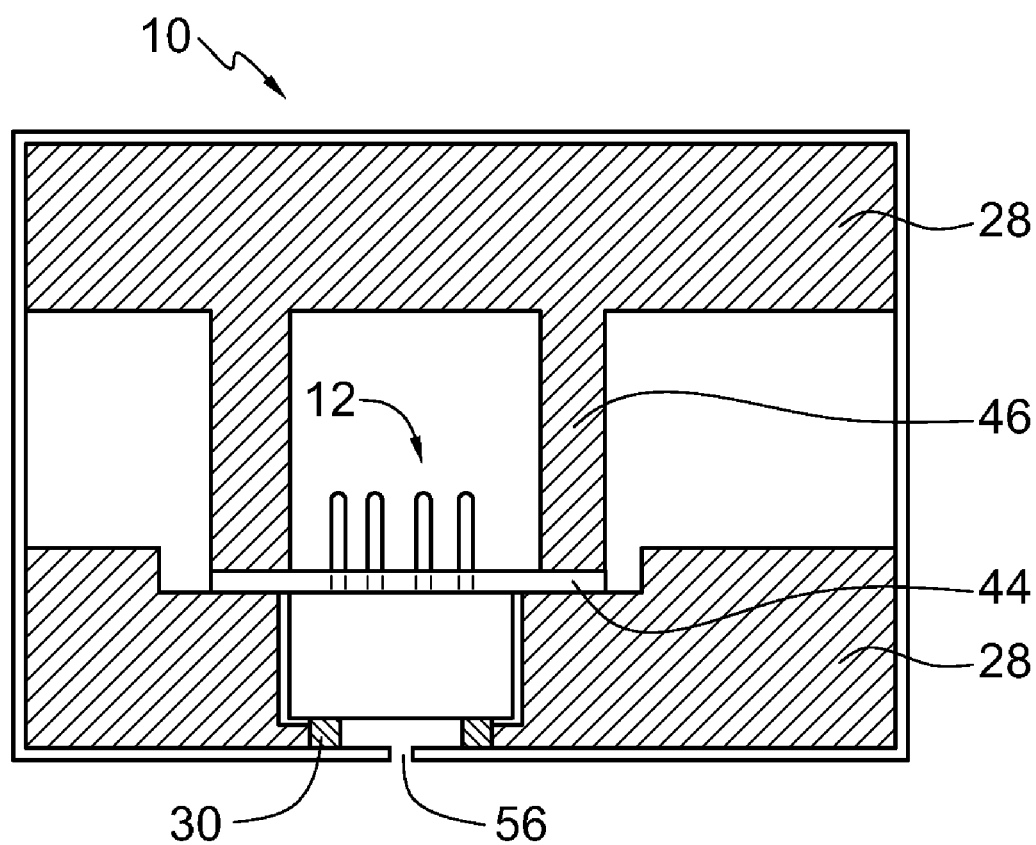
FIG. 4 is a side view of another example embodiment of the pressure transducer mounted within the housing of the underwater depth measurement device of the present application.

Referring to FIGS. 3 and 4, the contents of the housing 28 are filled with air or some gas, and water tight seals are used to reduce the likelihood of water from entering into the housing 28. In the embodiments of FIGS. 3 and 4, the gas inside the housing 28 remains at or near atmospheric pressure, which is approximately 1 bar, even though the pressure outside the housing 28 may increase dramatically during submersion underwater. Due to the large pressure difference inside and outside the housing 28, the water tight seals are very strong to reduce the likelihood of water from entering the housing 28.

In the embodiment shown in FIG. 3, an O-ring 30 having a generally square cross section is greased with a silicone lubricant. The piezoresistive ceramic transducer 12 is pressed against the O-ring 30 to form a seal that is effective against extreme water pressure. The mechanical tolerances in this configuration are very tight. As such, all surfaces should be smooth and free of debris. The piezoresistive ceramic transducer 12 is pressed against the O-ring 30 with a fixed amount of force. In this embodiment, the piezoresistive ceramic transducer 12 may can be pressed onto the O-ring 30 using screws 32 and washers 42.

Alternatively, as shown in FIG. 4, protrusions 46 from the housing 28 may be provided to apply pressure to a plate 44, which stops at a ledge, thereby pushing the piezoresistive ceramic transducer 12 against the O-ring 30. Similar to FIG. 3, PCB 54 communicates with the connectors 40 of the piezoresistive ceramic transducer 12, however, the PCB has been omitted from FIG. 4 for clarity.

In the embodiments of FIGS. 3 and 4, because the inside of the device 10 remains at atmospheric pressure, there will be a great pressure differential against the outside water, and the seal is able to handle that pressure. Failure of the seal will lead to failure of the device. When assembled, the O-ring 30 is spaced from the pressure sensitive area on the ceramic diaphragm. It will be appreciated by a person skilled in the art that the cross-section of the O-ring 30 is not limited to being generally square, other suitable cross-sections may alternatively be used.

In embodiments of the underwater depth measurement device 10 that are filled with air, extreme care may be taken to avoid moisture condensation onto the circuit including the electronic components of the device 10. If the air inside the device 10 is not completely free of moisture, then when the device 10 is cooled in cold water, water vapour may condense onto the electronic components in sufficient amounts to disrupt the piezoresistive ceramic transducer signal to a level which compromises the accuracy and resolution.

Figure 5:
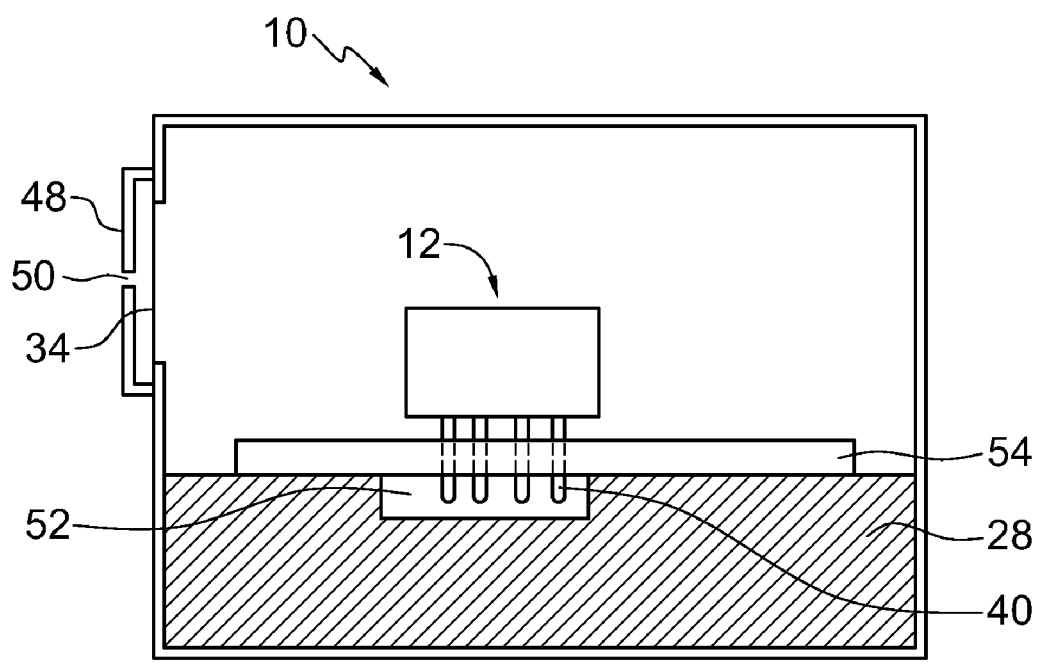
FIG. 5 is a side view of still another example embodiment of the pressure transducer mounted within the housing of the underwater depth measurement device of the present application.

In the embodiment shown in FIG. 5, the contents of the housing 28 are filled with a nonconductive oil, and water tight seals are provided in order to reduce the likelihood of water entry. A flexible membrane 34 maintains the inside of the housing 28 at ambient pressure. A protective shield 48 includes an aperture 50, which allows water touch the membrane 34. The membrane 34 ensures that the oil remains at almost exactly the same pressure as the outside water or air.

The piezoresistive ceramic transducer 12 is soldered to the circuit and is generally suspended freely in the nonconductive oil. A recess 52 is provided to allow space for the solder joints between the electrical connectors 40 and a PCB 54. In this embodiment, the housing 28 of the device 10 is generally rigid, made of metal or thick plastic, for example. The generally rigid housing 28 reduces the likelihood of flexing or distortion of the shape of the housing 28, which could cause small pressure increases within the oil, thus creating errors in pressure measurement.

Figure 6:
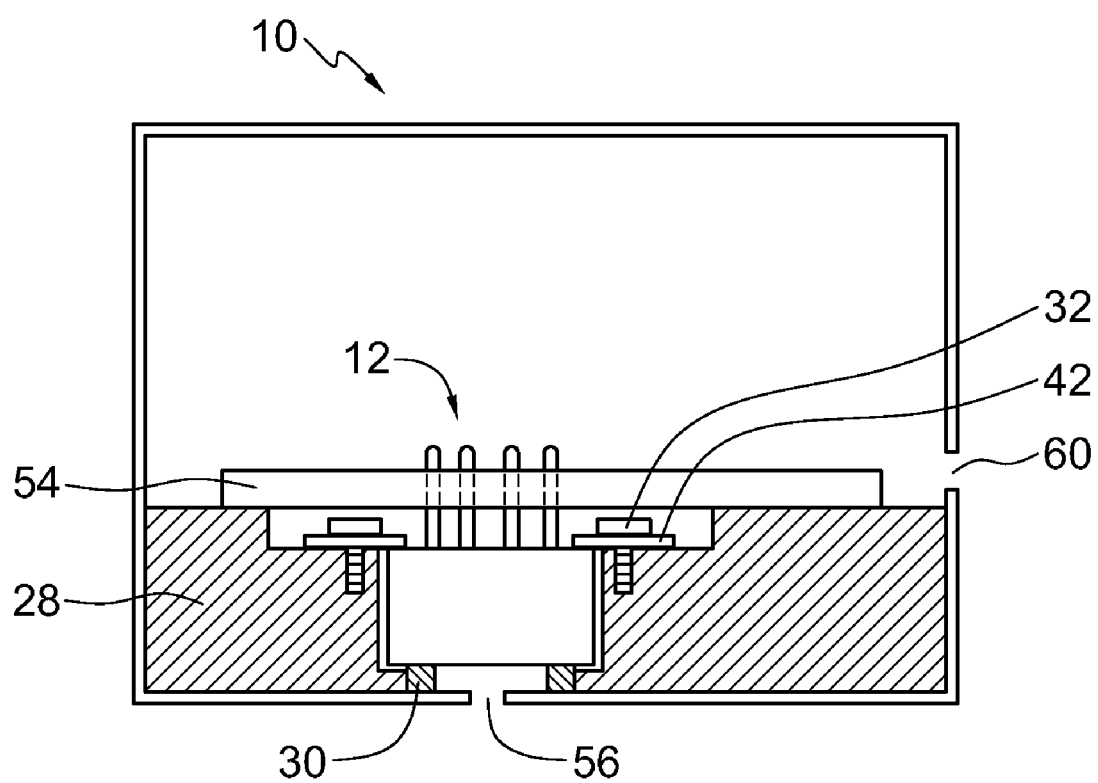
FIG. 6 is a side view of still another example embodiment of the pressure transducer mounted within the housing of the underwater depth measurement device of the present application.

Referring to FIG. 6, an embodiment in which the piezoresistive ceramic transducer 12 is potted and sealed with O-ring 30 is shown. The contents of the housing 28 are filled, or 'potted', with an adhesive elastomer, or potting compound, which would normally include a silicone, epoxy, urethane, polysulfide, acrylate, or other polymeric material which may vary from gelatinous to ultra rigid in hardness. Because the potting compound is bonded or glued to all the electronic components of the PCB 54, the electronic components are protected from water. In this embodiment, the inside of the housing 28 may be exposed to the ambient pressure of the water through aperture 60, although depending on the rigidity of the potting compound, the actual pressure that the electronics are exposed to may vary.

In the embodiment of FIG. 6, the piezoresistive ceramic transducer 12 is mounted and sealed with O-ring 30 in the same manner as the mounting method shown in FIG. 3. The area around the piezoresistive ceramic transducer 12 is filled with a very soft potting compound having a Shore hardness of A20 or softer. Once the soft potting compound is in place and dried or cured, the remainder of the device 10 can then be filled or potted with another potting compound. The second potting compound can be either rigid or soft. Even if the second potting compound is rigid, the high stresses within the rigid compound will not be transferred to the piezoresistive ceramic transducer 12, because it is surrounded by a soft potting compound. In this embodiment, because the inside of the device 10 is near ambient pressure, the pressure difference (if any), between the inside and the outside of the housing 28 is small. Therefore, the O-ring 30 is holding back only a very mild water pressure. This means the likelihood of O-ring failure is small. Further, even if the O-ring 30 failed, the soft potting compound would provide a second line of defense against water.

Figure 7:
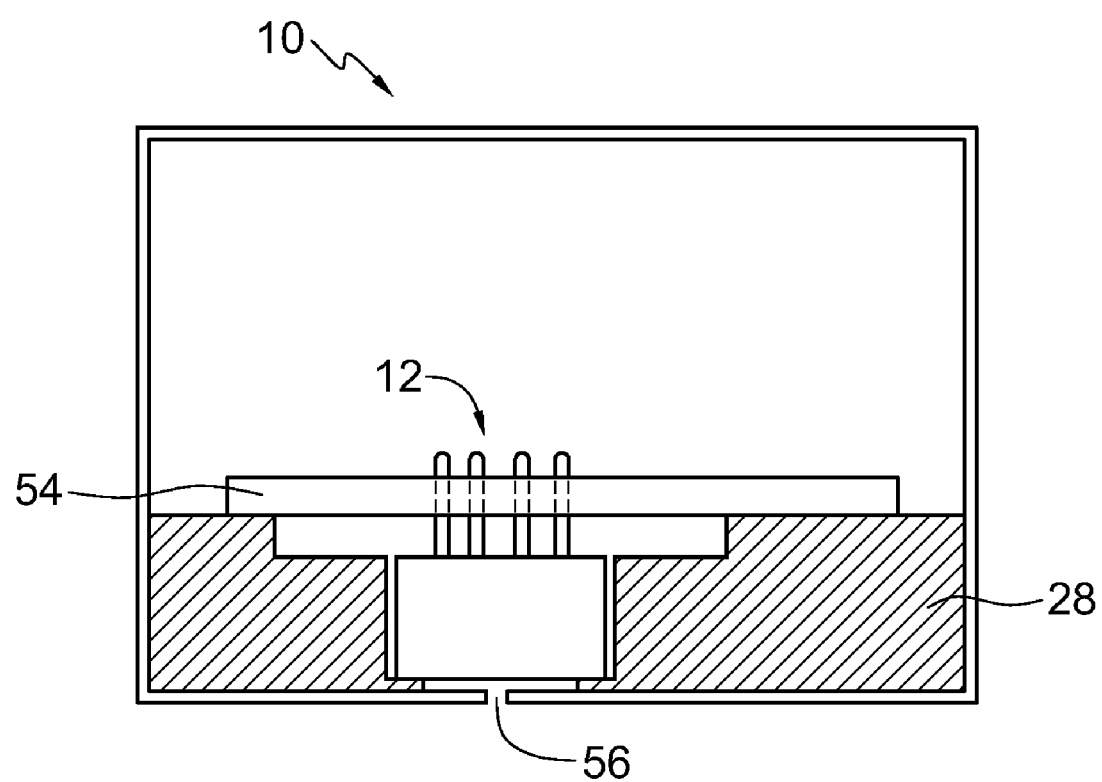
FIG. 7 is a side view of still another example embodiment of the pressure transducer mounted within the housing of the underwater depth measurement device of the present application.

Referring to FIG. 7, an embodiment in which the potted piezoresistive ceramic transducer 12 is exposed to ambient pressure with no O-ring 30 is shown. In this embodiment, the piezoresistive ceramic transducer 12 is mounted with no O-ring or physical pressure. The sensor is surrounded by a soft potting compound having a Shore hardness of A20 or softer. The remainder of the device 10 is potted with a different potting compound which may be either rigid or soft. In this embodiment, the soft potting compound that surrounds the piezoresistive ceramic transducer 12 is directly exposed to the outside water. Generally, potting compounds that are very soft have lower chemical and water resistance than rigid potting compounds. Therefore, soft potting compound is selected to ensure that the soft potting compound can withstand thousands of hours of saltwater immersion without compromising its sealing ability.

Figure 8:
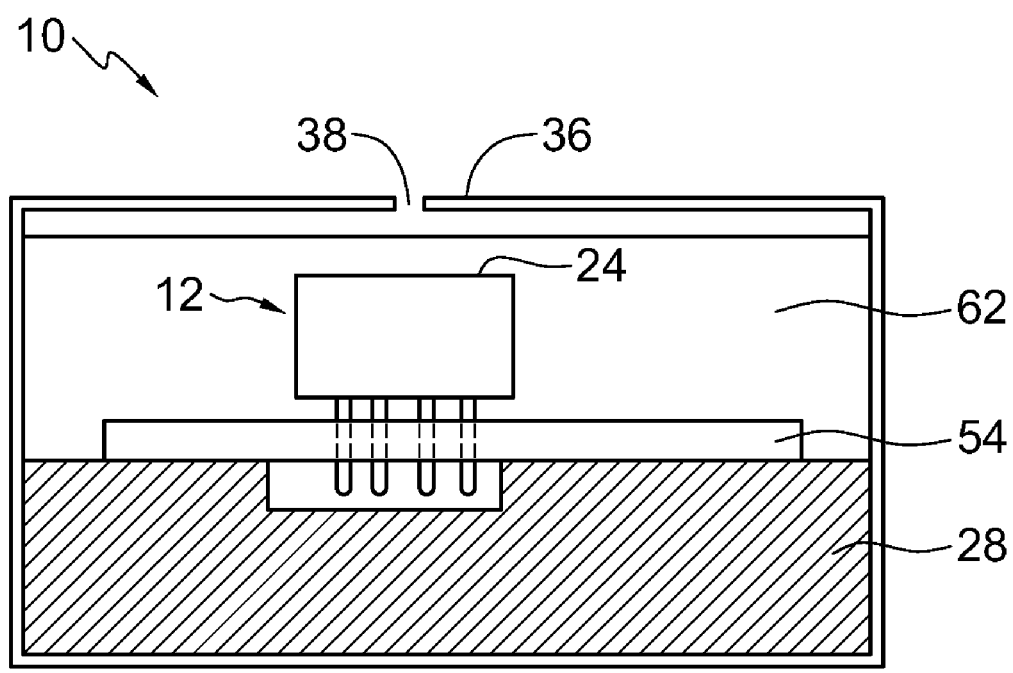
FIG. 8 is a side view of still another example embodiment of the pressure transducer mounted within the housing of the underwater depth measurement device of the present application.

Referring to FIG. 8, an embodiment is shown in which the piezoresistive ceramic transducer 12 is suspended freely in a soft adhesive polymer 62. The adhesive polymer is in direct contact with the water, and thus remains at ambient pressure. The soft nature of the polymer causes ambient pressure to be directly transmitted to the piezoresistive ceramic transducer 12. A thin layer of polymer provides thermal insulation for the ceramic diaphragm 24, reducing the risk of thermal shock errors, which will be discussed later. A rigid plate 36 protects the adhesive polymer from outside mechanical shocks, yet this plate 36 includes a small hole 38, which allows the outside pressure to still reach the polymer and the piezoresistive ceramic transducer 12. This embodiment is essentially the same as that referred to in FIG. 5, with the exception that the surrounding fluid is an adhesive polymer rather than an oil. The stability of the polymer eliminates the need for a membrane. The polymer should have a Shore hardness of A25 or softer.

Piezoresistive ceramic transducers are not available from the manufacturer in a calibrated form. Instead, calibration is performed when the piezoresistive ceramic transducer 12 is assembled into the underwater depth measurement device 10. The calibration coefficients are unique to each sensor, and are stored electronically and in a non-volatile fashion. Typically, flash, EEPROM or FRAM (ferroelectric) memories are used to store calibration information.

The piezoresistive ceramic transducer 12 outputs a signal which is proportional to the applied pressure. The signal amplitude is also dependent upon the temperature of the piezoresistive ceramic transducer 12. The output signal increases with pressure in a generally linear fashion. The actual relationship between the output signal, pressure and temperature is somewhat non-linear. Using fixed point arithmetic, the following relationship can be used to describe the output signal as a function of the pressure, temperature, and calibration coefficients C0, C1, C4, C5, C6:

$$\text{Pressure (mbar)} = 32768 * [(P + C0 + (C4*T/16384) + (C5*T*T/268435456)] / [C1 + (C6*T/16384)] \quad \text{(Eq. 1)}$$

in which: P=Pressure signal from transducer, after differential amplification and 15-bit digitization, T=Temperature signal from temperature sensor, 15-bit range, C0=offset, C1=gain, C6=temperature dependence of gain, C4=temperature dependence of offset and C5=optional second order nonlinear temperature dependence of offset.

In order to solve for the linear calibration coefficients (C0, C1, C4, C6), a traditional four point method is used. When the piezoresistive ceramic transducer 12 is mounted into the housing 28, small offsets in the output signal can be created. For that reason, the device 10 is calibrated after the piezoresistive ceramic transducer 12 has been mounted. Similarly, if the device 10 is going to be potted or filled with oil, it is once again more accurate to calibrate the device 10 after the device 10 has been filled with potting material or oil.

When tested, the device 10 is subjected to several pressures and temperatures, and the output signal in each situation is recorded: Equation 1 is evaluated at (i) atmospheric pressure at 30 C, where the atmospheric pressure is obtained via a precision barometer, (ii) atmospheric pressure at 3 C, where the atmospheric pressure is obtained via a precision barometer, (iii) a pressure of 20.00 bar, at 30 C and (iv) a pressure of 20.00 bar, at 3 C. This results in four equations with four variables (C0, C1, C4, C6). The resulting matrix can be reduced by Gaussian elimination, solving for the linear coefficients C0, C1, C4, C6.

Then, the device 10 in question can be tested at various random pressures and temperatures, and Equation 1 will produce a predicted pressure value in mBar. This pressure value can be compared with the actual known pressure to which the device was subjected to. This allows the accuracy of the sensor to be determined.

Using typical piezoresistive ceramic transducers, the resulting error is less than or equal to 0.5% of the full scale span (in this example, 0.0050*20 bar=0.10 bar=100 mbar, or about 100 cm over a range of 190 m of depth). An error of 100 cm is acceptable under water, however, is not acceptable at the surface for barometric pressure calculation. Since the barometric pressure can be used to determine altitude, and also determine the rate of long term gas unloading from a diver's bodily tissues, an accuracy of better than 100 mbar is desired.

The nonlinearity of the piezoresistive ceramic transducer 12 creates an error which is most apparent at atmospheric pressure. This error can be reduced by applying a second stage non-linear calibration of the atmospheric pressure. The following method was developed for this purpose: the four point linear calibration described above is used to solve for the coefficients C0, C1, C4, C6. Of these coefficients, the gain C1 and temperature dependence of gain C6, are left constant. The other two coefficients C0 and C4 are rejected and considered still variable. The additional non-linear coefficient C5 (Equation 1) is added and considered variable. The device under test is cooled to 3 C. The device 10 is then gradually re-warmed at atmospheric pressure, from 3 C to 45 C. At 5 C and every 5 C thereafter (5 C, 100, 15 C . . . ), the pressure signal is recorded, and Equation 1 is evaluated, this time including the C5 coefficient. Allowing only the coefficients C0, C4 and C5 to vary, this produces 9 equations in 3 variables, an inconsistent system. The resulting inconsistent system of equations can be written in matrix form as: Ax=b, in which, A=matrix, x=vector consisting of C0, C4, C5, b=constant vector. The above inconsistent system can be solved for the 'best fit' values of C0, C4 and C5 by applying a least squares matrix projection (multiply both sides by A transpose): ATAx=ATb.

Reducing the above matrix equation by Gaussian elimination automatically solves for the best possible values of C0, C4 and C5, such that the least square error of the atmospheric pressure is reduced to the best effect possible for second order non-linear compensation. Once the values of C0, C1, C4, C5, and C6 are known for a particular device, those coefficients are stored in non-volatile memory. The non-volatile memory is generally re-writeable, so the device 10 can be re-calibrated at a later time. Many piezoresistive ceramic transducer 12 experience a long term drift, such that after 5 or 10 years the output value is somewhat offset from the original value. The device 10 may be recalibrated and the new values stored in the non-volatile memory.

Given the low voltage of the output signal of the piezoresistive ceramic transducer 12, high levels of electrical noise may be present. Desired accuracy and resolution can be achieved by reducing this electrical noise. The noise may be reduced using either a hardware solution or a software solution. In hardware, a low pass filter can be applied between the piezoresistive ceramic transducer 12 and the analog to digital converter. This has the advantage that it does not increase the software complexity, but it has the disadvantage that it may introduce additional non-linearities to the signal. Further, the extreme low level of the signal means that the low pass filter may be rather advanced. To reduce costs, a software method may be equally effective. Firstly, the integration time of the analog to digital converter 16 may be extended to the longest amount feasible for the application. If the depth may be updated to the user once per second, then the integration time of the analog to digital converter 16 could be extended to near one second. If a simple low cost analog to digital converter is used where the integration time cannot be controlled or cannot be largely controlled, then digital filters can be used. For example, a 64-point moving average could be used, or alternatively a 9 or 11 point median filter produces good results.

Another challenge with piezoresistive ceramic transducers 12 is the occurrence of thermal shock errors. When the piezoresistive ceramic transducer 12 is exposed to rapid temperature change, the ceramic housing 26 may buckle unevenly, causing random flexing of the ceramic diaphragm 24. This can create momentary but enormous errors. Typically, the thermal shock error will occur when a diver who is in warm sunlight suddenly jumps into freezing cold water. The freezing cold water floods the ceramic diaphragm 24, causing uneven cooling across the ceramic housing 26. Large increases or decreases in the pressure signal may result, causing anomalous readings up to 15 m of depth. Several methods have been developed to reduce thermal shock errors.

In order to reduce thermal shock errors, the ceramic diaphragm 24 may be protected from sudden inrush of water by including a barrier perforated by small holes. The small holes maintain the piezoresistive ceramic transducer at the ambient pressure of the water while reducing the sudden inrush of cold water. In one embodiment, long thin holes are provided to trap air and slow the exchange of air and water in the vicinity of the piezoresistive ceramic transducer 12.

In the embodiment of FIG. 8, the ceramic diaphragm 24 is coated with a thin layer of insulating gel. The additional thermal insulation decreases the rate of temperature change when cold water rushes in.

In the embodiment of FIG. 5, the device 10 is constructed using the oil filled method. The oil provides large thermal insulation against sudden changes in temperature, generally eliminating any thermal shock errors.

In another embodiment, digital filtering in software may be applied. A simple moving average will reduce the amplitude of the error, but will not eliminate it. Therefore, taking the derivative of the reading from the temperature sensor 20 will tell the microcontroller 16 if the device 10 is experiencing an extreme temperature change. If the derivative of the temperature signal is greater than a certain amount, the microcontroller 16 uses the 'last known' pressure value before the sudden temperature change, and continues using that value until the derivative of the temperature signal is reduced below the threshold, after which pressure measurement resumes as normal. Since the derivative of the temperature sensor 20 may only increase a few seconds after the sudden temperature change has begun, the derivative of the pressure signal itself can be taken. Sudden thermal shock can create a rate of change of pressure which is faster than any diver could ever achieve by swimming up or down in depth. The microcontroller 16, upon detecting an impossible rate of change of pressure, can use the last known good value until the derivative of the both the pressure signal and temperature sensor 20 return within limits.

For underwater depth measurement devices 10, the smallest possible piezoresistive ceramic transducer 12 capable of absolute pressure measurement is desired. In one embodiment, the piezoresistive ceramic transducer 12 has a diameter of 18 mm. In another embodiment, the piezoresistive ceramic transducer 12 has a diameter of 15 mm.

When receiving batches of piezoresistive ceramic transducers 12 for large volume manufacturing, care may be taken to only use piezoresistive ceramic transducers 12 without defects. Although the manufacturer of the piezoresistive ceramic transducers 12 certainly will take precautions to reduce the likelihood of a defective product from being sold, defects can still occur. Ideally, to increase reliability, pre-screening of piezoresistive ceramic transducers 12 may be performed prior to mounting the piezoresistive ceramic transducers 12 into devices 10. A jig may be constructed where the piezoresistive ceramic transducer 12 can be quickly plugged in, where the jig displays the piezoresistive ceramic transducer 12 offset in millivolts. This ensures both that the resistive bridge of the piezoresistive ceramic transducer 12 was properly manufactured and that the offset is within limits. The noise level of the signal can also be measured. Piezoresistive bridges that have been poorly manufactured can display unusually high noise levels. The jig can analyze the standard deviation of the signal over a fixed time period and a threshold can be decided upon, where if the threshold is exceeded, the noise level is considered excessive and the piezoresistive ceramic transducer 12 rejected. Further, visual inspection is critical, since the ceramic diaphragm 24 can contain hairline cracks, or surface imperfections. Hairline cracks can create sensor failure or implosion prior to the rated pressure. Surface imperfections can compromise the O-ring seal when mounting the sensor, which may lead to flooding.

In order to reduce cost, assembly time of each underwater depth measurement device 10 maybe reduced. This is accomplished by accelerating or automating the calibration process for large volume manufacturing. In one embodiment, the microcontroller 16 in the depth measuring device is loaded with firmware for automating calibration. A pressure vessel used for calibration may be connected to computer controlled solenoid valves, which themselves connect and disconnect a compressor and relief valves. Further, a liquid heater/chiller commonly used in industry Can heat and cool liquid run through copper tubing around a chamber of the pressure vessel. The liquid heater/chiller can also be controlled by a PC. This allows the PC to automatically heat or cool the devices 10 under calibration to fixed temperatures. Further, the PC can pressurize or depressurize the devices 10 automatically. If this computer controlled chamber is combined with proper firmware loaded into the microcontrollers 16 inside the devices 10 being calibrated, then the entire calibration process can be automated, thereby reducing labor and cost.

In one embodiment, to further increase the reliability of the depth measurement device 10, two or more redundant piezoresistive ceramic transducers can be used, such that if one fails, the values from the still functioning transducer(s) can be used.

In another embodiment, the underwater depth measurement device 10 does not include a display device. In this embodiment, the underwater electronic depth measuring device 10 acts as a data logger, storing depth information in a memory.

The piezoresistive ceramic transducer 12 has an advantage because it is of rugged construction. There are no microscopic wires to break or debond. Further, the ceramic diaphragm 24, which is exposed on the outside of the piezoresistive ceramic transducer 12, is unaffected by corrosive liquids, such as seawater. As a further example, holding such a sensor in one's hand, one can simply press on the ceramic diaphragm 24 and the pressure value read by the pressure transducer 12 will dramatically increase, and this will in no way cause damage to the pressure transducer 12. Applying a similar finger pressure to a gel filled silicon sensor would instantaneously cause the gel to flex and break the microscopic wires inside.

Due to its general design and construction, the piezoresistive ceramic transducer 12 has a very minor failure rate when compared to silicon sensors. The cost of the piezoresistive ceramic transducers 12 range from $10-$15 USD in sufficient quantities.

The above-described embodiments are intended to be examples only. Alterations, modifications and variations can be effected to the particular embodiments by those of skill in the art without departing from the scope of the present application, which is defined solely by the claims appended hereto.

What is claimed is:

1. An underwater depth measurement device, comprising:
   a housing;
   a piezoresistive ceramic transducer received in the housing, the piezoresistive ceramic transducer being operable to measure changes in absolute pressure of less than 0.001 bar;
   an electronic circuit operably connected to the piezoresistive ceramic transducer to receive signals from the piezoresistive ceramic transducer in response to measured changes in absolute pressure and to amplify the signals;
   a temperature sensor;
   a microprocessor operably connected to the electronic circuit and the temperature sensor, the microprocessor for receiving amplified signals and a signal corresponding to a measured temperature;
   wherein the underwater depth measurement device determines a depth based on the measured changes in absolute pressure and the measured temperature.

2. An underwater depth measurement device as claimed in claim 1, wherein the piezoresistive ceramic transducer has a diameter of 15 mm.

3. An underwater depth measurement device as claimed in claim 1, comprising a display device framed by the housing.

4. An underwater depth measurement device as claimed in claim 1, wherein an inside of the housing is maintained at atmospheric pressure.

5. An underwater depth measurement device as claimed in claim 4, wherein the housing is filled with air or gas.

6. An underwater depth measurement device as claimed in claim 1, wherein an inside of the housing is maintained at ambient pressure.

7. An underwater depth measurement device as claimed in claim 1, wherein the piezoresistive ceramic transducer is surrounded by a potting compound.

8. An underwater measurement device as claimed in claim 1, wherein an aperture of the housing allows water to contact a ceramic diaphragm of the piezoresistive ceramic transducer.

9. An underwater measurement device as claimed in claim 8, wherein a layer of polymer is provided between the ceramic diaphragm and water entering the housing in order to provide thermal insulation to the piezoresistive ceramic transducer.

10. An underwater depth measurement device as claimed in claim 1, wherein the housing is filled with a non-conductive oil.

11. An underwater depth measurement device as claimed in claim 7, wherein the potting compound is an adhesive polymer.

* * * * *